Patented Mar. 5, 1940

2,192,828

UNITED STATES PATENT OFFICE 2,192,828

THERAPEUTIC AGENT

Troy C. Daniels, Burlingame, Calif., assignor to Research Corporation, New York, N. Y., a corporation of New York No Drawing. Application April 3, 1939, Serial No. 265,818

3 Claims. (Cl. 260—295)

This invention relates to compounds adapted to be administered in the treatment of bacterial infections such as beta hemolytic streptococcus, pneumococcus, gonococcus, etc.

Only a few of the several hundred compounds heretofore studied have been found to be suitable and effective in the treatment of such bacterial infections. Among such compounds is p-aminobenzenesulfonamide or sulfanilamide. It has a relatively simple structure and is the basis or starting point of many of the other compounds or derivatives which have been prepared and tested. Recently 2-(p-aminobenzenesulfanamido) pyridine has been described and is said to be more effective in the treatment of pneumococcus infections than is sulfanilamide. The azo compounds derived from sulfanilamide are commonly regarded as being less effective. Benzylaminobenzenesulfonamide has been used but probably also is less effective than sulfanilamide.

I have found that the introduction of a nicotinyl group into a compound of the type of sulfanilamide improves its properties, in certain respects at least, for use in the treatment of such infections. In the case of sulfanilamide for instance the toxicity is reduced and the effectiveness of the resulting nicotinylsulfanilamide is greater for certain types of infections than sulfanilamide.

Other examples of nicotinyl derivatives of the type referred to are the mono and dinicotinyl derivatives of 4,4'-diaminophenylsulfone, i. e., 4-nicotinylamino-4'-aminophenylsulfone having the formula

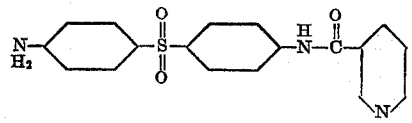

and 4,4'-dinicotinylaminophenylsulfone having the formula

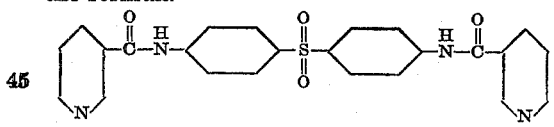

and 4-nicotinylamino-4'-N-methylene sodium sulfinate of phenylsulfone having the formula

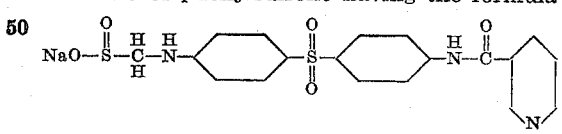

Various methods may be employed for the preparation of the nicotinyl derivatives. The best method which I have found for the preparation of nicotinylsulfanilamide, i. e., the method which gives the most satisfactory yields is by reacting nicotinyl chloride with dry sulfanilamide in the presence of anhydrous pyridine. This method in detail is as follows. Equal molecular quantities of dry p-aminobenzenesulfonamide and nicotinyl chloride are placed in a dry reaction flask with 1 cc. of dry pyridine for each gram of the sulfanilamide. The mixture is heated on a steam bath for 1 hour, cooled and 4-5 volumes of cold water added, allowed to stand 30 minutes and filtered. The residue is washed with cold water and recrystallized from 50% ethyl alcohol.

The yield obtained by reacting nicotinyl chloride on sulfanilamide in the presence of anhydrous benzene is not satisfactory. Likewise only a small yield is obtained by fusing a mixture of nicotinic acid and sulfanilamide at a temperature of 180° C. for 2-3 hours with additions of small amounts of dry toluene at intervals. Other methods which have been tried are the reaction of nicotinyl chloride with dry sulfanilamide in anhydrous acetone and the direct fusion of nicotinic acid with dry sulfanilamide at 180° C. for 4 to 5 hours. Since the invention is primarily concerned with the products I have not been particularly concerned with the method or methods of making them excepting to the extent of determining that they can be made. Further research will no doubt result in better methods of making the products.

The reactions involved in the production of nicotinylsulfanilamide are as follows

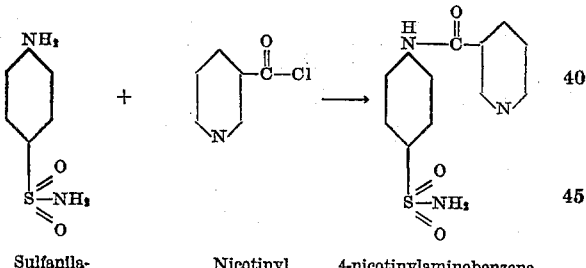

Sulfanilamide + Nicotinyl chloride → 4-nicotinylaminobenzene sulfonamide

The nicotinyl chloride is prepared by reacting nicotinic acid with thionyl chloride.

The product, purified by recrystallization from 50% ethyl alcohol, is a white crystalline solid and when pure has a melting point of 257° C. (corrected). Its molecular weight is calculated as being 277 and has been determined by Menges' method as being 275.

The properties of sulfanilamide are considerably modified by the introduction of the nicotinyl group. Its solubility in water is decreased. The sodium salt of the nicotinylsulfanilamide undergoes hydrolysis readily in water thus showing the properties of a very weak acid whereas sulfanilamide similarly tested shows somewhat stronger acidic properties. The nicotinylsulfanilamide is considerably less toxic than sulfanilamide and is effective against streptococcus in doses only half as large. It is very slightly soluble in water but is somewhat soluble in organic solvents such as ethyl alcohol and propylene glycol. It is absorbed from mucous membranes including the gut and is excreted in the urine over a period of 24 hours either as such or in some other form in which the amino group is muzzled. Mice, rats and other small animals have been given dosages as high as 12 grams per kilogram, which is about as much as conveniently can be given by mouth, without fatality. In humans, doses of 0.5 gram, taken by mouth produce no evidence of local irritation or other objectionable effect. It doses of 1 gram per day for five days, orally, it has been found to be about twice as effective as sulfanilamide in protecting mice from death by streptococcus infections. In chronic pneumococcus infections in mice it seems more effective in preventing death than sulfanilamide or sulfapyridine. Whereas central nervous system depression is observed in the use of sulfanilamide no such effect, even with maximum doses, is observed with the nicotinyl derivative.

A possible explanation of the superior properties of nicotinylsulfanilamide may be that the nicotinyl group acts as a carrier for the sulfanilamide into an infecting organism, thus improving its effectiveness. Moreover aromatic amines in general are capable of forming methemoglobin and it is therefore not surprising that sulfanilamide in large doses frequently cause methemoglobinemia. The blocking of the basic amino group of the sulfanilamide with the nicotinyl group may serve to minimize this tendency and at the same time result in a product of lower toxicity. Furthermore one of the toxic manifestations of sulfanilamide is a general dermatitis and since nicotinic acid is very effective in the correction of dermatitis associated with pellagra it is possible that it has a similar action in combination with sulfanilamide and thus renders the product free of this action.

So far as I am aware nicotinylsulfanilamide is the first instance of the successful internal use of nicotinic acid or any derivative of it as a bactericidal or bacteriostatic agent.

An objection to the nicotinylsulfanilamide of course is its low solubility which renders it unfit for parenteral administration and also less desirable in the case of serious emergencies requiring quick action, than the more soluble agents such as sulfanilamide.

I claim:
1. 4-nicotinylaminobenzenesulfonamide having the formula

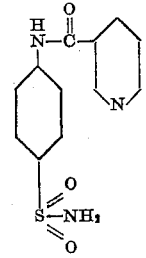

2. A bactericidal or bacteriostatic composition comprising as the active bactericidal or bacteriostatic agent 4-nicotinylaminobenzenesulfonamide.

3. The process of producing p-nicotinylaminobenzenesulfonamide, which consists in reacting p-amino-benzenesulfonamide with a nicotinyl chloride.

TROY C. DANIELS.